(12) United States Patent
Huang et al.

(10) Patent No.: US 11,300,755 B2
(45) Date of Patent: Apr. 12, 2022

(54) DRIVING MECHANISM

(71) Applicant: TDK TAIWAN CORP., Taoyuan (TW)

(72) Inventors: Chen-Hsin Huang, Taoyuan (TW);
Shao-Chung Chang, Taoyuan (TW);
Shou-Jen Liu, Taoyuan (TW);
Chen-Chi Kuo, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 39 days.

(21) Appl. No.: 16/875,444

(22) Filed: May 15, 2020

(65) Prior Publication Data

US 2020/0363606 A1 Nov. 19, 2020

Related U.S. Application Data

(60) Provisional application No. 62/887,905, filed on Aug. 16, 2019, provisional application No. 62/849,317, filed on May 17, 2019.

(51) Int. Cl.
*G02B 7/04* (2021.01)

(52) U.S. Cl.
CPC .................................. *G02B 7/04* (2013.01)

(58) Field of Classification Search
CPC ............... G02B 7/04; G02B 7/02; G02B 7/10
USPC .......................................................... 359/823
See application file for complete search history.

(56) References Cited

U.S. PATENT DOCUMENTS

| 2015/0116828 A1* | 4/2015 | Chen ................... G02B 27/646 |
| | | 359/557 |
| 2017/0090146 A1* | 3/2017 | Ishiguro ................... G02B 7/08 |
| 2019/0162930 A1* | 5/2019 | Min ........................ G02B 7/102 |
| 2019/0170967 A1* | 6/2019 | Jung ...................... G03B 13/36 |
| 2019/0306393 A1* | 10/2019 | Cho ...................... H04N 5/2257 |

* cited by examiner

*Primary Examiner* — William R Alexander
(74) *Attorney, Agent, or Firm* — Muncy, Geissler, Olds & Lowe, P.C.

(57) ABSTRACT

A driving mechanism for driving an optical element to move is provided, including a movable part, a fixed part, a housing connected to the fixed part, and a buffer member. The movable part is configured to hold the optical element. The fixed part is connected to the movable part, wherein the movable part is movable relative to the fixed part. The housing has a top cover and at least a sidewall connected to the top cover. The buffer member is disposed on the housing and extends from the top cover to the sidewall.

19 Claims, 11 Drawing Sheets

DRIVING MECHANISM

CROSS REFERENCE TO RELATED APPLICATIONS

This application claims priority of provisional U.S. Patent Application Ser. No. 62/849,317, filed on May 17, 2019, and provisional U.S. Patent Application Ser. No. 62/887,905, filed on Aug. 16, 2019, the entirety of which are incorporated by reference herein.

BACKGROUND OF THE INVENTION

Field of the Invention

The application relates in general to a driving mechanism, and in particular, to a driving mechanism for moving an optical element.

Description of the Related Art

As technology has advanced, a lot of electronic devices (cameras and smartphones, for example) have incorporated the functionality of taking photographs and recording video. These electronic devices have become more commonplace, and have been developed to be more convenient and thin. More and more options are provided for users to choose from.

In some electronic devices, several coils and magnets corresponding thereto are usually used for adjusting the focus of a lens. However, miniaturization of the electronic devices may increase the difficulty of mechanical design, and it may also lead to low reliability and a low driving force for moving the lens. Therefore, addressing the aforementioned problems has become a challenge.

BRIEF SUMMARY OF INVENTION

In view of the aforementioned problems, the object of the invention is to provide a driving mechanism for driving an optical element to move. The driving mechanism includes a movable part, a fixed part, a housing connected to the fixed part, and a buffer member. The movable part is configured to hold the optical element. The fixed part is connected to the movable part, wherein the movable part is movable relative to the fixed part. The housing has a top cover and at least a sidewall connected to the top cover. The buffer member is disposed on the housing and extends from the top cover to the sidewall.

In some embodiments, the housing has two sidewalls connected to the top cover, and the buffer member extends into a gap between the two sidewalls.

In some embodiments, the sidewalls respectively form a slope surface adjacent to the gap.

In some embodiments, the buffer member covers a part of the housing by insert molding.

In some embodiments, the buffer member covers a corner of the housing and protrudes outward from the top cover and the sidewall.

In some embodiments, the buffer member comprises plastic material, and a recess and a nub are formed on the buffer member, wherein the nub is located in the recess.

In some embodiments, the top cover is quadrilateral in shape, and the housing has four sidewalls connected to the top cover, wherein the buffer member extends from the top cover to the four sidewalls.

In some embodiments, the driving mechanism further includes an outer case and a flexible sheet disposed on an inner surface of the outer case, wherein the flexible sheet faces the top cover of the housing.

In some embodiments, the driving mechanism further includes an outer case and a flexible sheet disposed on an inner surface of the outer case, wherein the flexible sheet faces the sidewall of the housing.

In some embodiments, the fixed part forms a recess, and the movable part forms a protrusion received in the recess, wherein the protrusion has two chamfered surfaces arranged along the optical axis of the optical element, and the two chamfered surfaces constitute a step structure that is tapered along the optical axis.

In some embodiments, the driving mechanism further includes a first adhesive and a second adhesive, wherein the fixed part forms a cavity, and the housing forms a through hole corresponding to the cavity, wherein the first adhesive is disposed between the housing and the fixed part, and the second adhesive is disposed in the cavity and the through hole.

In some embodiments, the cavity is formed and shaped corresponding to an injection nozzle of a mold during the molding process of the fixed part.

In some embodiments, the driving mechanism further includes a conductive element embedded in the fixed part, and the second adhesive is disposed in the cavity and contacts the conductive element.

In some embodiments, the viscosity of the second adhesive is higher than the viscosity of the first adhesive.

In some embodiments, the driving mechanism further includes a conductive element, wherein the fixed part forms at least a protrusion extending along the optical axis of the optical element, and the conductive element has an engaging portion extending along the optical axis and embedded in the protrusion.

In some embodiments, a plurality of recesses are formed at an edge of the engaging portion In some embodiments, the driving mechanism further includes a plurality of conductive elements, wherein the fixed part forms a plurality of protrusions extending along the optical axis of the optical element, and the conductive elements respectively have an engaging portion extending along the optical axis and embedded in the protrusions.

In some embodiments, a plurality of recesses are formed at an edge of the engaging portion.

In some embodiments, the engaging portions respectively have a flat structure and are not parallel to each other.

In some embodiments, the fixed part is quadrilateral in shape, and the protrusions are located at four corners of the fixed part.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
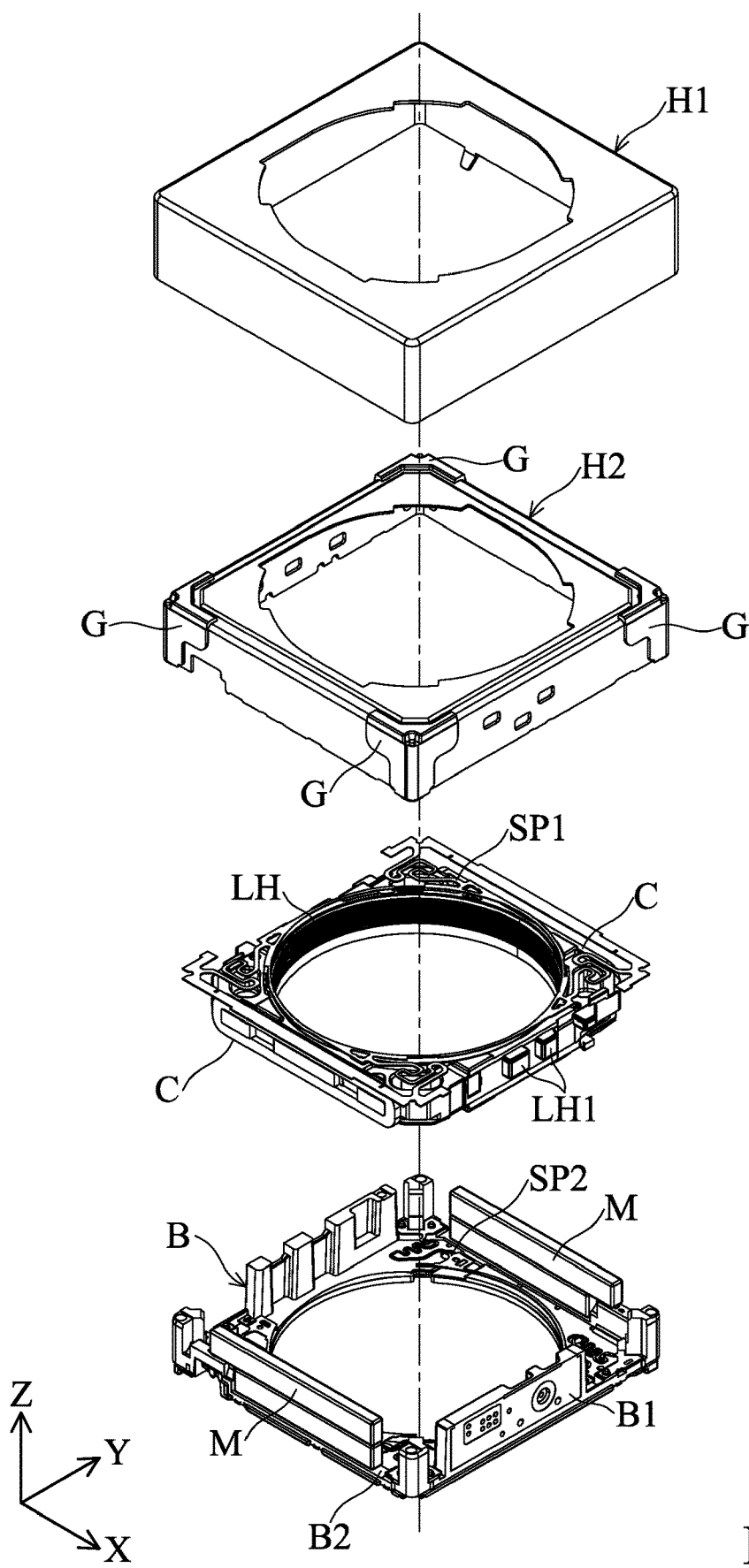
FIG. 1 shows an exploded diagram of a driving mechanism, in accordance with an embodiment of the invention.

FIG. 1 shows an exploded diagram of a driving mechanism, in accordance with an embodiment of the invention. Referring to FIG. 1, the driving mechanism in this embodiment primarily comprises an outer case H1, a housing H2, a movable part LH, and a fixed part B affixed to the housing H2. The movable part LH is movably received in a space between the housing H2 and the fixed part B for holding an optical element (not shown). The housing H2, the movable part LH, and the fixed part B are housed by the outer case H1 to prevent damages from the impact of external objects.

As shown in FIG. 1, the movable part LH is connected to the fixed part B via two spring sheets SP1 and SP2. Moreover, two coils C are disposed on opposite sides of the movable part LH, and correspondingly, two magnets M are disposed on opposite sides of the fixed part B. When a current signal is applied to the coils C, the coils C and the magnets M can produce an electromagnetic force to move the movable part LH and the optical element relative to the fixed part B. In this embodiment, the movable part LH can be driven to move in a direction parallel to or perpendicular to the optical axis of the optical element, so as to achieve auto-focusing or Optical Image Stabilization (OIS).

For example, the driving mechanism may comprise a Voice Coil Motor (VCM), and the movable part LH may be used to hold an optical lens. The optical lens and the driving mechanism can constitute a camera lens module of a hand-held electronic device (e.g. cell phone or tablet computer) for photographing or video recording.

Figure 3:
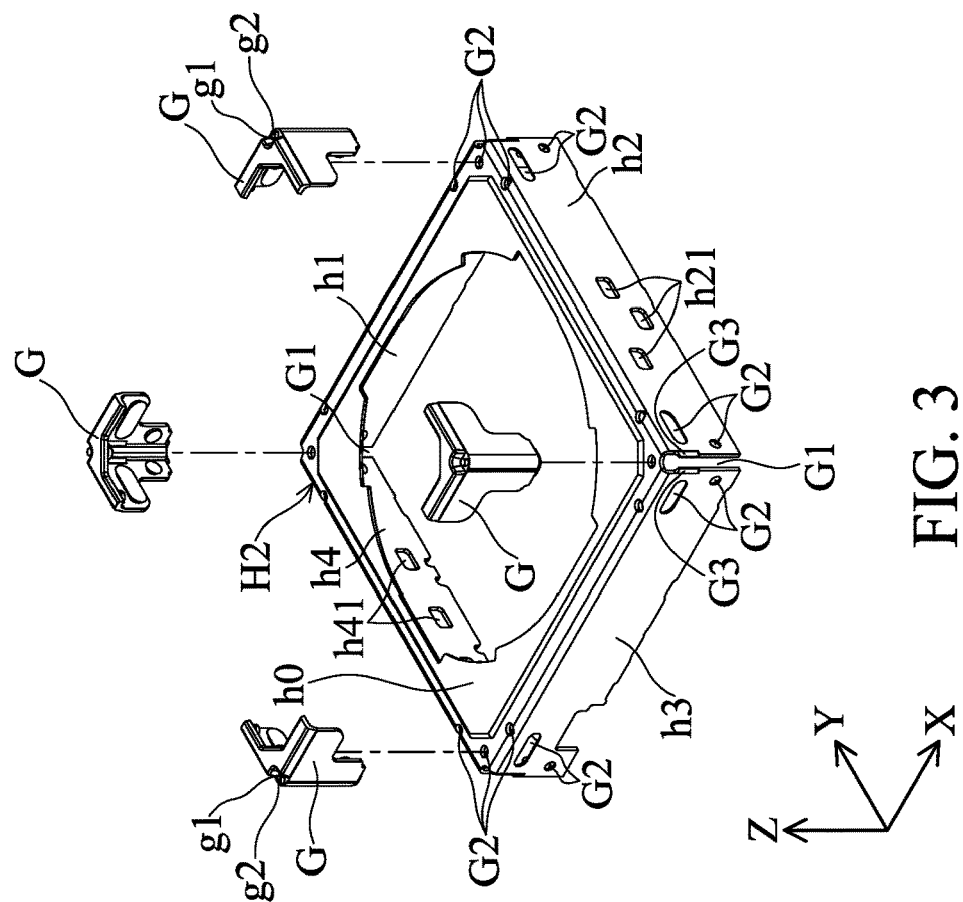
FIG. 3 shows an exploded diagram of the housing H2 in FIG. 2.
Figure 2:
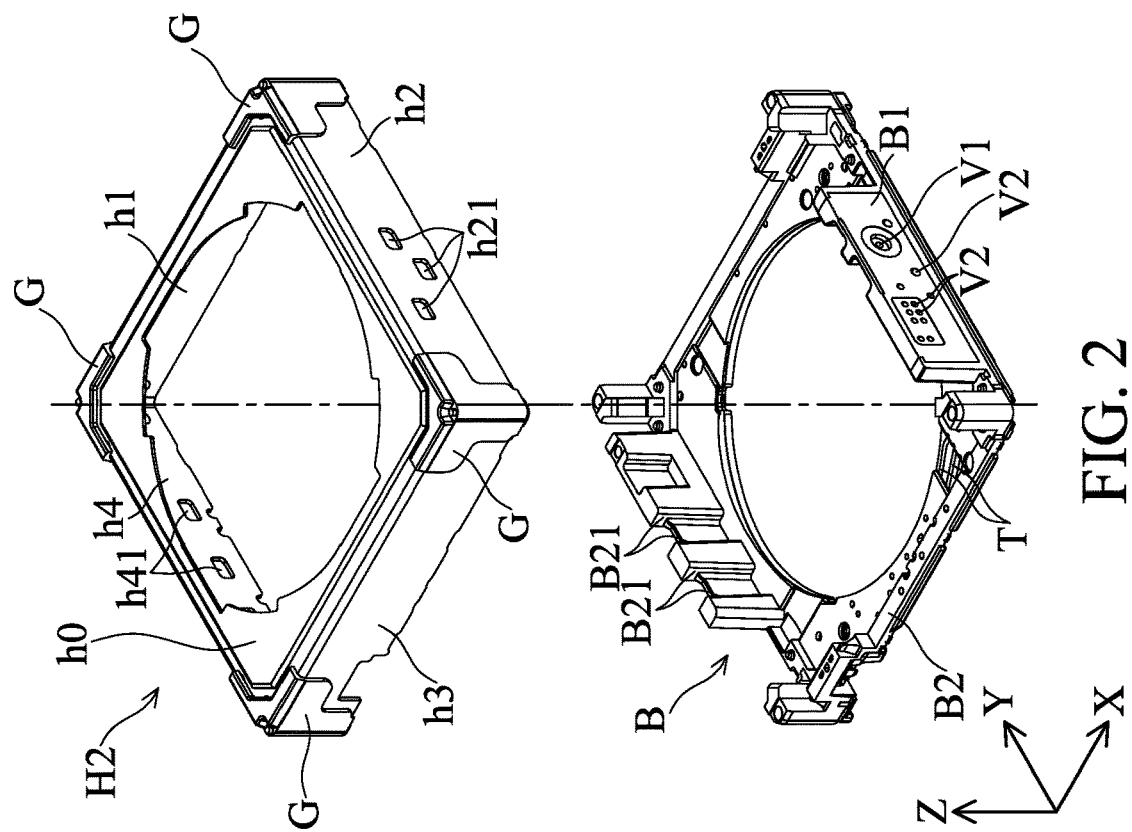
FIG. 2 shows an exploded diagram of the housing H2 and the fixed part B in FIG. 1.

FIG. 2 shows an exploded diagram of the housing H2 and the fixed part B in FIG. 1. FIG. 3 shows an exploded diagram of the housing H2 in FIG. 2. Referring to FIGS. 1 to 3, the housing H2 in this embodiment comprises a metal body and four plastic buffer members G. The metal body can be formed by stamping or punching processes, and it comprises a quadrilateral top cover h0 and four sidewalls h1, h2, h3, and h4 extending downward from the top cover h0. It should be noted that the sidewalls h1, h2, h3, and h4 are not directly connected to each other, wherein four gaps G1 are formed between the sidewalls h1, h2, h3, and h4, Each of the buffer members G can be formed by insert molding to cover the corner of the metal body. As shown in FIGS. 2 and 3, the four buffer members G protrude outward from the top cover h0 and the sidewalls h1, h2, h3, and h4 of the metal body, so as to prevent damages from the impact of the outer case H1. Moreover, as several holes G2 are formed on the top cover h0 and the sidewalls h1, h2, h3, and h4, the buffer members G can extend into the gaps G1 and the holes G2 and firmly grip the metal body during the molding process. Here, the edges of the sidewalls h1, h2, h3, and h4 respectively forms a slope surface G3 adjacent to the gap G1, thus enhancing connection strength between the buffer members G and the metal body. FIG. 3 further shows that a recess g1 is formed at a corner of each buffer member G, and a nub g2 is formed in the recess g1, corresponding to the injection nozzle of the mold.

Figure 5:
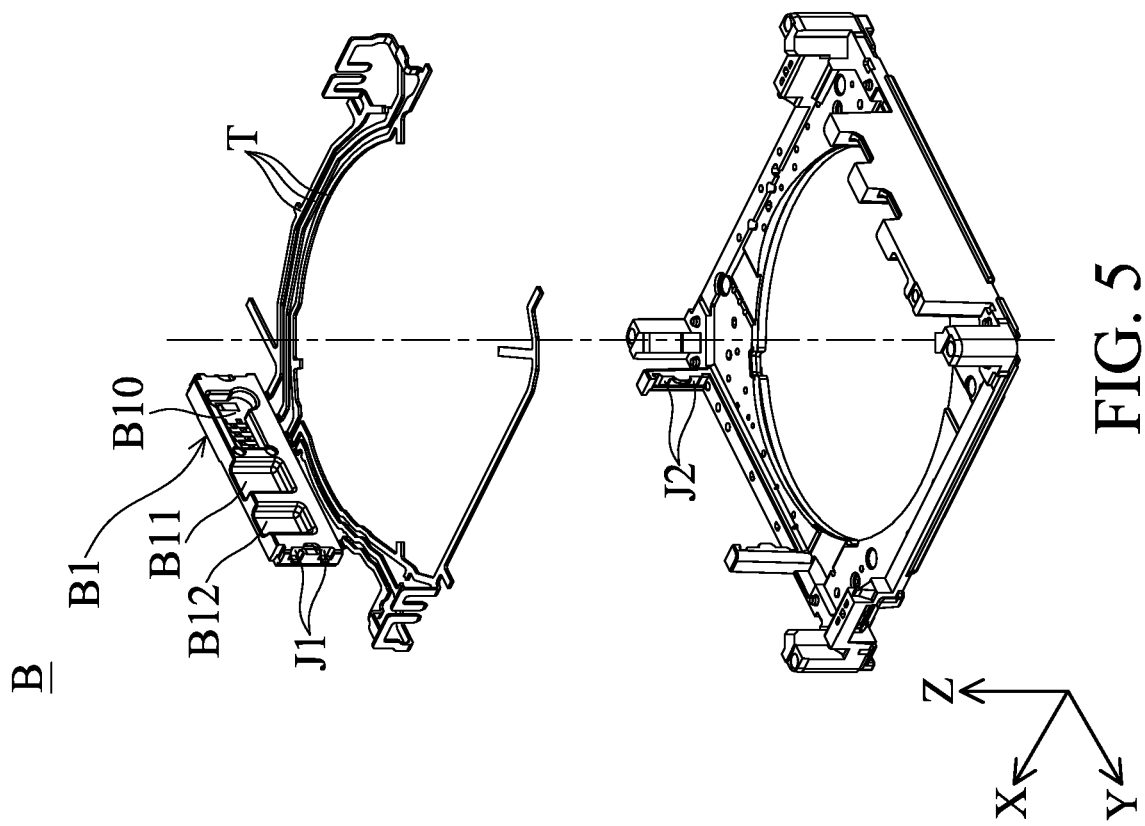
FIGS. 4 and 5 are exploded diagrams of the fixed part B in FIG. 2 from different viewing angles.
Figure 4:
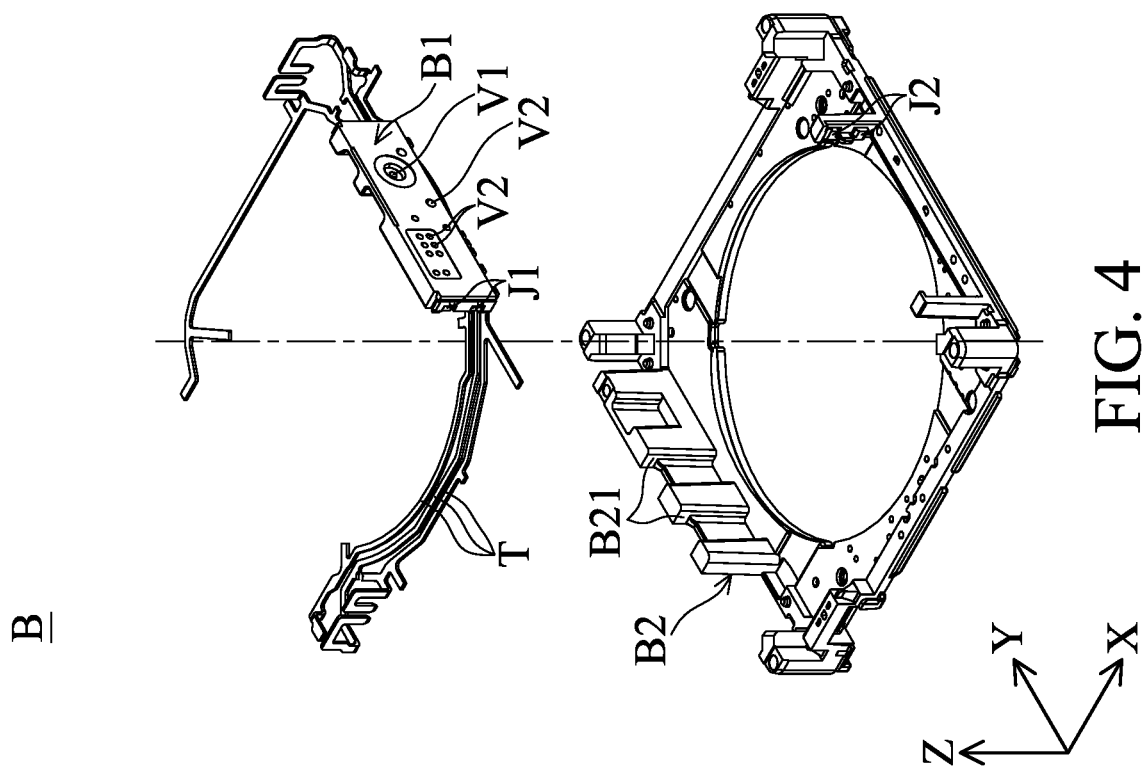

FIGS. 4 and 5 are exploded diagrams of the fixed part B in FIG. 2 from different viewing angles. Referring to FIGS. 2, 4, and 5, the fixed part B has a first plastic body B1 and a second plastic body B2, and at least a conductive element T is embedded in the first and second plastic bodies B1 and B2 for electrical signal communication. In this embodiment, the first plastic body B1 is substantially parallel to the YZ plane, and the second plastic body B2 is substantially parallel to the XY plane.

Specifically, a depressed structure B10 and two recesses B11 and B12 are formed on the inner side of the first plastic body B1 (FIG. 5). The depressed structure B10 is used for receiving IC elements, and the recesses B11 and B12 are used for receiving the protrusions LH1 on a side of the movable part LH (FIG. 1), so as to restrict the movement or rotation of the movable part LH along the horizontal plane (XY plane). In some embodiments, the depressed structure B10 may be formed on the outer side of the first plastic body B1 and faces the housing H2.

During the manufacturing process of the fixed part B, the first plastic body B1 can be formed by insert molding to partially cover the conductive elements T. Subsequently, the conductive elements T are forced to bend as the state show in FIGS. 4 and 5, and the second plastic body B2 is then formed by insert molding to partially covers the conductive elements T and the first plastic body B1, as shown in FIG. 2. It should be noted that the melting point of the first plastic body B1 is higher than that of the second plastic body B2.

Referring to FIG. 4, two recesses B21 are formed on the inner side of the second plastic body B2 for receiving two protrusions LH1 on a side of the movable part LH, wherein the top end of the recess B21 is wider than the bottom end of the recess B21. That is, the opening of the recess B21 is wider than the bottom of the recess B21, and the sidewalls of the recess B21 are slope surfaces that have a draft angle relative to the Z axis. Thus, the second plastic body B2 can be successfully released from the mold after the molding process.

In FIGS. 4 and 5, at least a first joining structure J1 (e.g. recess) is formed on a lateral surface of the first plastic body B1, and at least a second joining structure J2 (e.g. protrusion) is formed on the second plastic body B2 and located corresponding to the first joining structure J1. Thus, the first and second joining structures J1 and J2 can be firmly joined with each other during the molding process of the second plastic body B2, so as to enhance the connection strength of the first and second plastic bodies B1 and B2.

Figure 6:
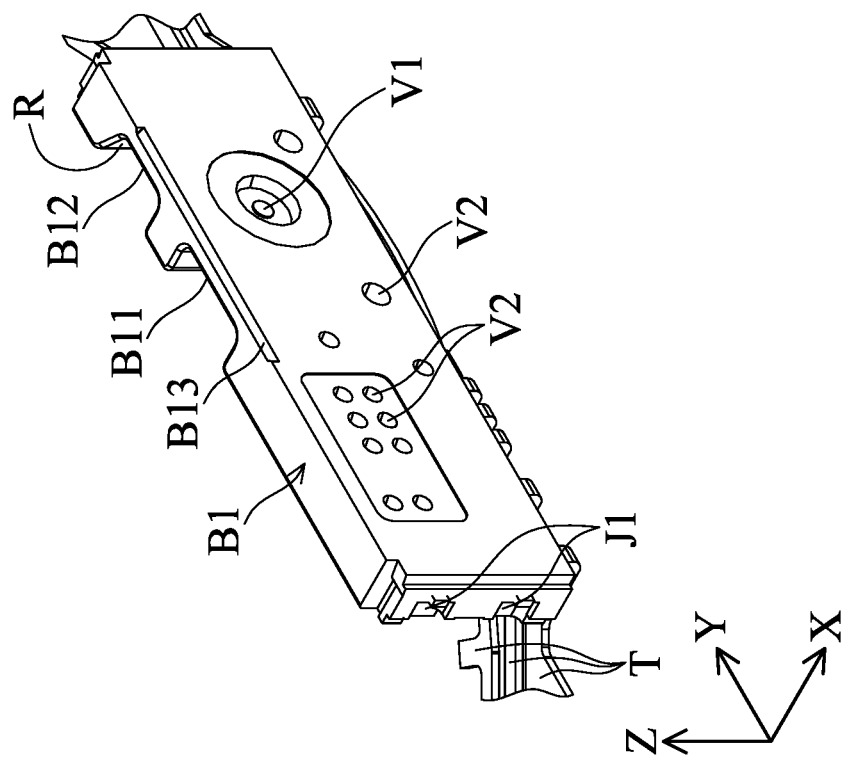
FIG. 6 is an enlarged view of the first plastic body B1 in FIG. 4.

FIG. 6 is an enlarged view of the first plastic body B1 in FIG. 4. Referring to FIGS. 2, 4, and 6, a cavity V1 and several cavities V2 are formed on the outer side of the first plastic body B1, wherein the cavity V1 is formed and shaped corresponding to the injection nozzle of the mold, and the cavities V2 are formed and shaped corresponding to the ejector pins or other positioning elements in the mold. It should be noted that the ejector pins are in contact with the conductive elements T during molding process, so that the conductive elements T can be restricted in a predetermined position of the first plastic body B1.

As shown in FIG. 2, several through holes h21 and h41 are formed on the sidewalls h2 and h4. The through holes h21 and h41 are located on opposite sides of the housing H2 and not symmetrical with respect to the center of the driving mechanism. Specifically, the through holes h21 are positioned corresponding to the cavities V1 and V2, so as to accommodate the glue or facilitate rapid heat dissipation. In FIG. 6, a groove 13 (e.g. slope surface) is formed at an edge of the first plastic body B1 for guiding the glue, so that the first plastic body B1 can be firmly adhered to the housing H2.

Figure 7:
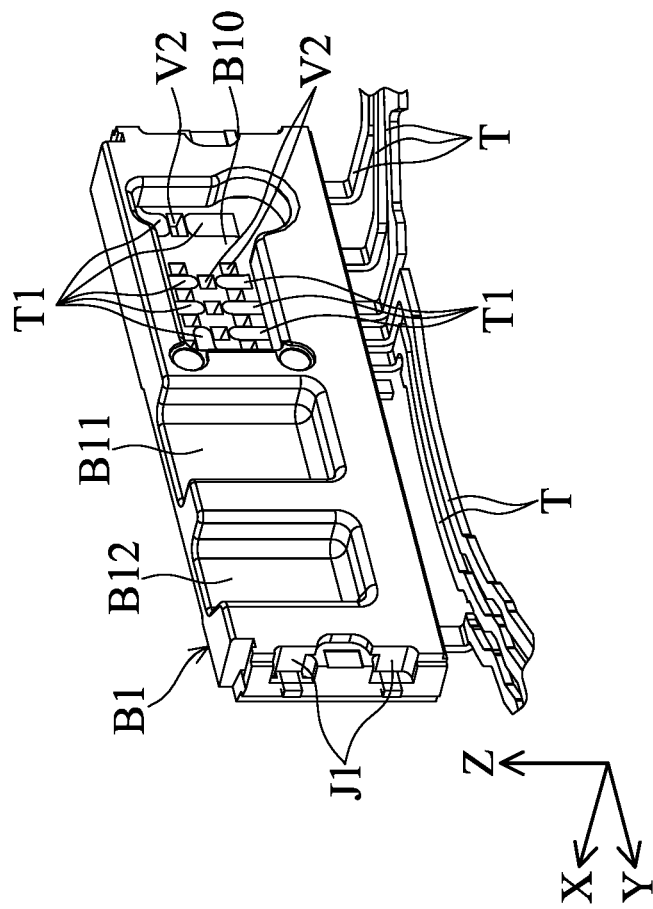
FIG. 7 is an enlarged view of the first plastic body B1 in FIG. 5.

FIG. 7 is an enlarged view of the first plastic body B1 in FIG. 5. Referring to FIGS. 5 and 7, the depressed structure B10 is formed on the inner side of the first plastic body B1, and the terminals T' of the conductive elements T are exposed to a bottom surface of the depressed structure B10.

Figure 9:
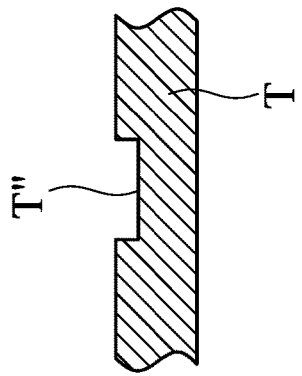
FIG. 9 is an enlarged cross-sectional view of a conductive element T that forms a groove T".
Figure 8:
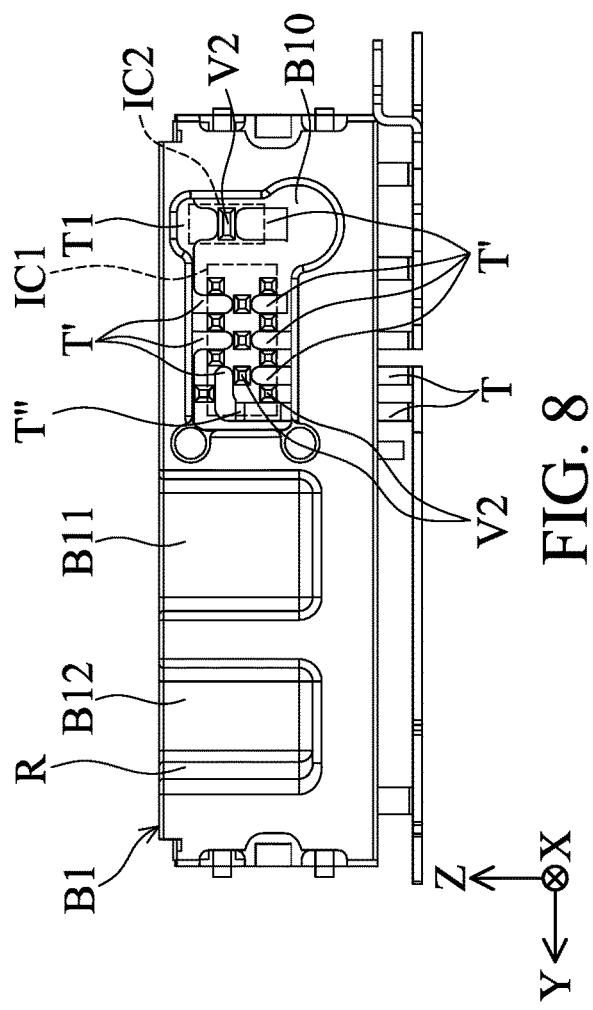
FIG. 8 is a schematic diagram showing two IC elements IC1 and IC2 disposed in the depressed structure B10 and electrically connected to the terminals T' of the conductive elements T, in accordance with an embodiment of the invention.

FIG. 8 is a schematic diagram showing two IC elements IC1 and IC2 disposed in the depressed structure B10 and electrically connected to the terminals T' of the conductive elements T, in accordance with an embodiment of the invention. FIG. 9 is an enlarged cross-sectional view of a conductive element T that forms a groove T''.

Referring to FIG. 8, two IC elements IC1 and IC2 can be positioned in the depressed structure B10 and electrically connected to the terminals T' of the conductive elements T by soldering. As shown in FIGS. 7 and 8, several cavities V2 are formed on the bottom surface of the depressed structure B10, and they are shaped corresponding to the ejector pins in the mold. It should be noted that the ejector pins may contact the conductive elements T, so that the conductive elements T are restricted in a predetermined position of the first plastic body B1 during the molding process.

Specifically, as shown in FIGS. 8 and 9, a groove T' is formed on a top surface of a conductive element T and located near the terminal T'. Thus, flowing of the solder along the conductive element T can be suppressed when the IC element IC1 is soldered to the terminal T', so that defective soldering and tilt of the IC element IC1 can be avoided. After the soldering process, the glue can be applied in the depressed structure B10 to encompass and protect the IC elements IC1 and IC2.

Referring to FIGS. 4-6 and 8, the first plastic body B1 is formed on a side of the quadrilateral fixed part B (parallel to the Y axis), and the recess B12 has a slope surface R angled with respect to the side of the fixed part B. It should be noted that the slope surface R and a conductive element T inside the first plastic body B1 partially overlap when viewed in a horizontal direction (X direction). Thus, when the protrusion LH1 of the movable part LH (FIG. 1) collides with the slope surface R, stress concentration can be reduced to facilitate high reliability and miniaturization of the driving mechanism.

Figure 11:
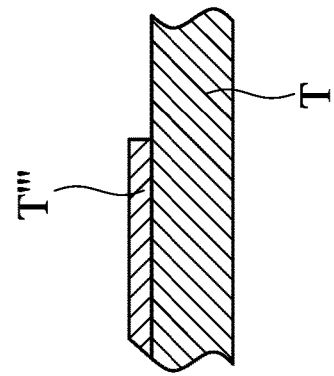
FIG. 11 is an enlarged cross-sectional view showing the block T'" in FIG. 10 that covers a part of a conductive element T.
Figure 10:
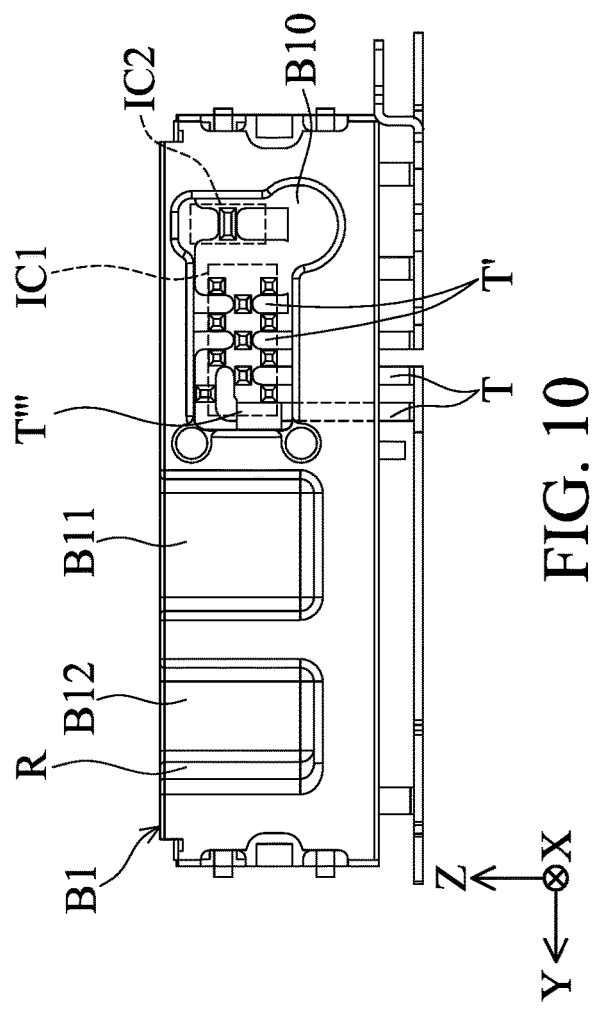
FIG. 10 is a schematic diagram showing a block T'" disposed on a conductive element T in the depressed structure B10, in accordance with another embodiment of the invention.

FIG. 10 is a schematic diagram showing a block T''' disposed on a conductive element T in the depressed structure B10, in accordance with another embodiment of the invention. FIG. 11 is an enlarged cross-sectional view showing the block T''' in FIG. 10 that covers a part of a conductive element T.

Referring to FIGS. 10 and 11, in another embodiment of the invention, a plastic block T' may be provided in the depressed structure B10 to cover a part of a conductive element T. As the block T' is located near the terminal T', flowing of the solder along the conductive element T can be suppressed when the IC element IC1 is soldered to the terminal T', so that defective soldering and tilt of the IC element IC1 can be avoided.

In some embodiments, one or several bumps may be formed on the bottom surface of the depressed structure B10 to support the IC element IC1, so that a gap is formed between the IC element IC1 and the bottom surface of the depressed structure B10. Thus, defective soldering and tilt of the IC element IC1 can also be efficiently avoided.

Figure 12:
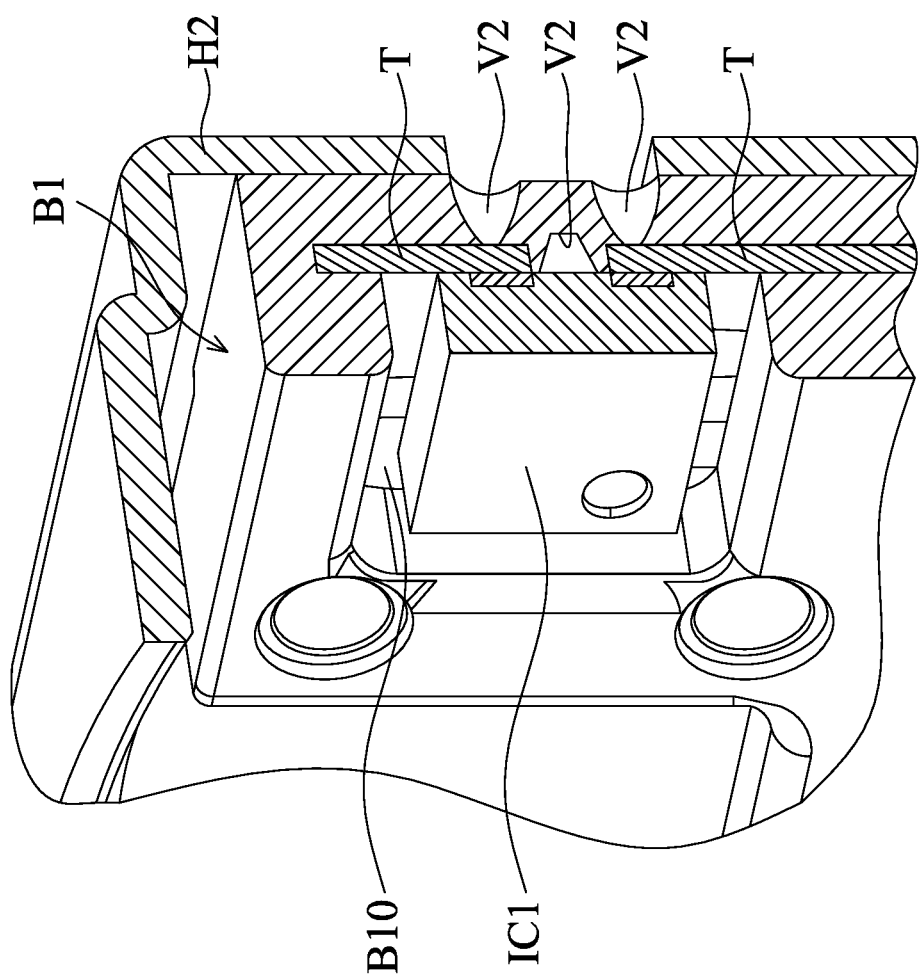
FIG. 12 is a cross-sectional diagram showing the conductive elements T exposed to a side of the first plastic body B1 through the cavities V2.

FIG. 12 is a cross-sectional diagram showing the conductive elements T exposed to a side of the first plastic body B1 through the cavities V2. Referring to FIG. 12, several conductive elements T are electrically connected to the IC element IC1, and several cavities V2 are formed on both the inner and outer sides of the first plastic body B1. Specifically, the conductive elements T are exposed to the outer side of the first plastic body B1 through the cavities V2 for rapid heat dissipation.

Figure 13:
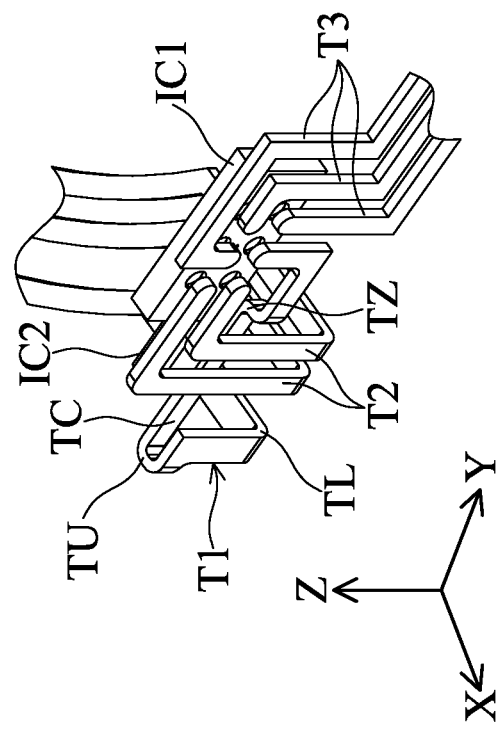
FIGS. 13 and 14 are perspective diagrams showing several conductive elements T1, T2, and T3 connected to the IC elements IC1 and IC2.
Figure 15:
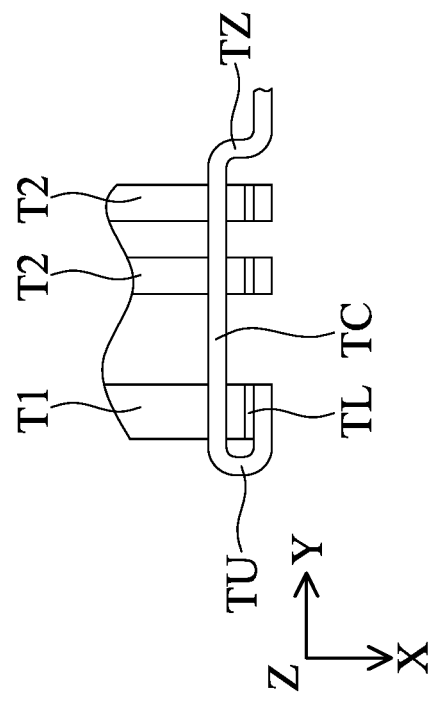
FIG. 15 is an enlarged diagram showing the conductive element T1 traverses two second conductive elements T2 along the Y axis.
Figure 14:
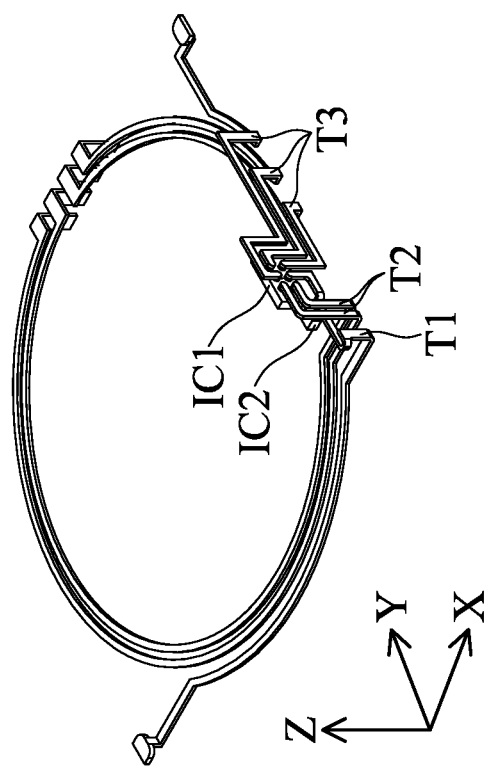
Figure 16:
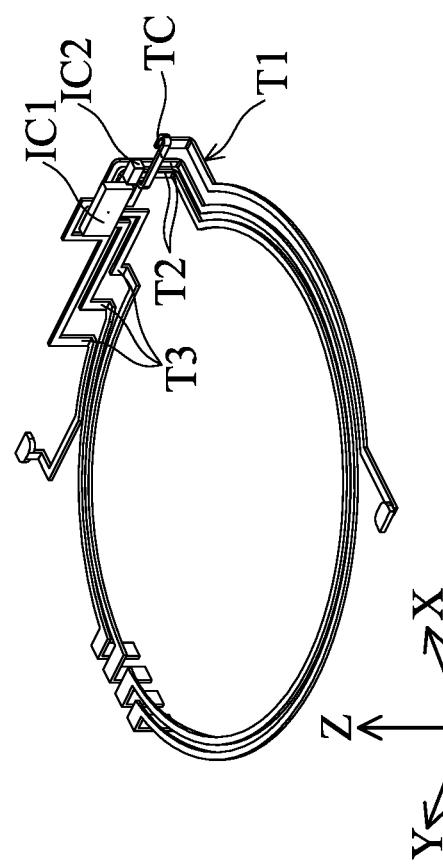
FIG. 16 is another enlarged diagram showing the conductive element T1 traverses two second conductive elements T2 along the Y axis.

FIGS. 13 and 14 are perspective diagrams showing several conductive elements T1, T2, and T3 connected to the IC elements IC1 and IC2. FIG. 15 is an enlarged diagram showing the conductive element T1 traverses two second conductive elements T2 along the Y axis. FIG. 16 is another enlarged diagram showing the conductive element T1 traverses two second conductive elements T2 along the Y axis.

As shown in FIGS. 13-16, the six conductive elements T1, T2, and T3 are embedded in the fixed part B of the driving mechanism for electrically connecting to the IC elements IC1 and IC2 on the first plastic body B1, wherein the first plastic body B1 is formed on a side of the fixed part B (parallel to the Y axis). Here, the conductive element T1 traverses at least a second conductive element T2 along the Y axis, and the first and second conductive elements T1 and T2 partially overlap when viewed in a horizontal direction (X direction) perpendicular to the side of the fixed part B.

In this embodiment, the first conductive element T1 has a Z-shaped portion TZ, an extending portion TC, an U-shaped portion TU, an L-shaped portion TL. The extending portion TC traverses the second conductive elements T2 and connects the Z-shaped portion TZ to the U-shaped portion TU. It should be noted that the extending portion TC is embedded in the first plastic body B1, and the L-shaped portion TL is embedded in the second plastic body B2 of the fixed part B.

Figure 17:
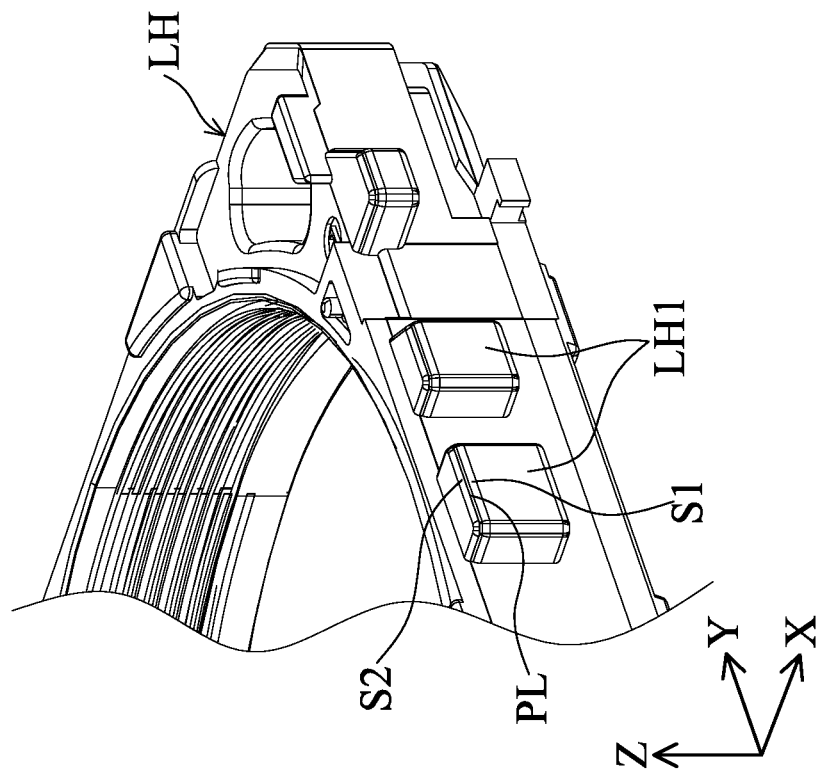
FIG. 17 is a partial enlarged view of the movable part LH in FIG. 1.

FIG. 17 is a partial enlarged view of the movable part LH in FIG. 1. Referring to FIG. 17, two opposite sides of the movable part LH respectively form at least a protrusion LH1. The protrusion LH1 can be received in the recess B11, B12, or B21, so as to restrict the movement or rotation of the movable part LH along the horizontal plane (XY plane).

Still referring to FIG. 17, two chamfered surfaces S1 and S2 are formed on the top end portion of the protrusion LH1 and located adjacent to each other. Here, the two chamfered surfaces S1 and S2 are arranged along the optical axis of the optical element (Z direction) and form a step structure tapered in the Z direction. It should be noted that a parting line PL is formed between the two chamfered surfaces S1 and S2. During plastic injection molding of the movable part LH, the female and male mold parts are connected to each other at the parting line PL.

Figure 18:
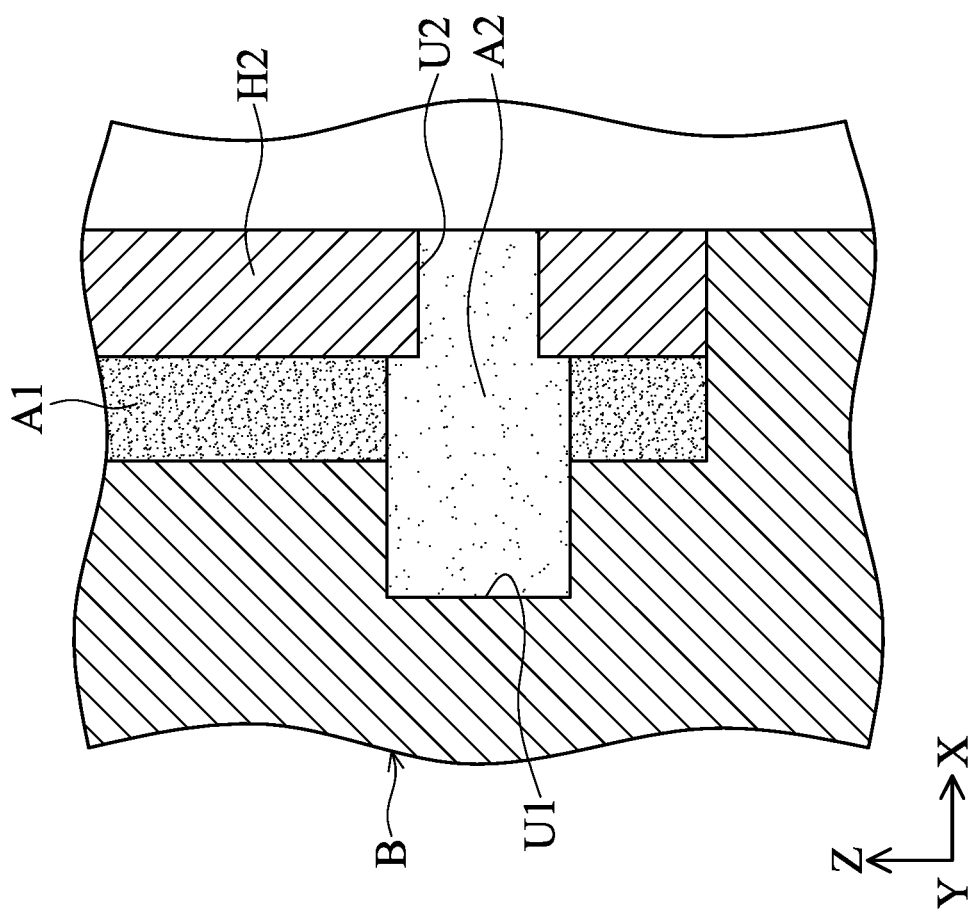
FIG. 18 is an enlarged cross-sectional view showing the housing H2 affixed to the fixed part B by a first adhesive A1 and a second adhesive A2, in accordance with an embodiment of the invention.

FIG. 18 is an enlarged cross-sectional view showing the housing H2 affixed to the fixed part B by a first adhesive A1 and a second adhesive A2, in accordance with an embodiment of the invention. Referring to FIG. 18, the fixed part B forms a cavity U1, and the housing H2 forms a through hole U2 corresponding to the cavity U1. During assembly of the driving mechanism, a first adhesive A1 is disposed between the outer surface of the fixed part B and the inner surface of the housing H2. Subsequently, a second adhesive A2 is applied to the cavity U1 via the through hole U2, wherein the viscosity of the second adhesive A2 is higher than the viscosity of the first adhesive A1.

In this embodiment, the housing H2 and the fixed part B are adhered to each other not only by the first adhesive A1, but also the second adhesive A2 (more viscous than the first adhesive A1). The second adhesive A2 can applied in the cavity U1 and the through hole U2, thus further enhancing the connection strength between the housing H2 and the fixed part B.

In some embodiments, the cavity U1 may be the cavity V1 in FIG. 2 that is formed and shaped corresponding to an injection nozzle in the mold during the forming process of the fixed part B. In some embodiments, the cavity U1 may be the cavity V2 in FIG. 2 that penetrates the fixed part B and connect to the conductive element T, wherein the second adhesive A2 can be applied in the cavity U1 to contact the conductive element T.

Figure 20:
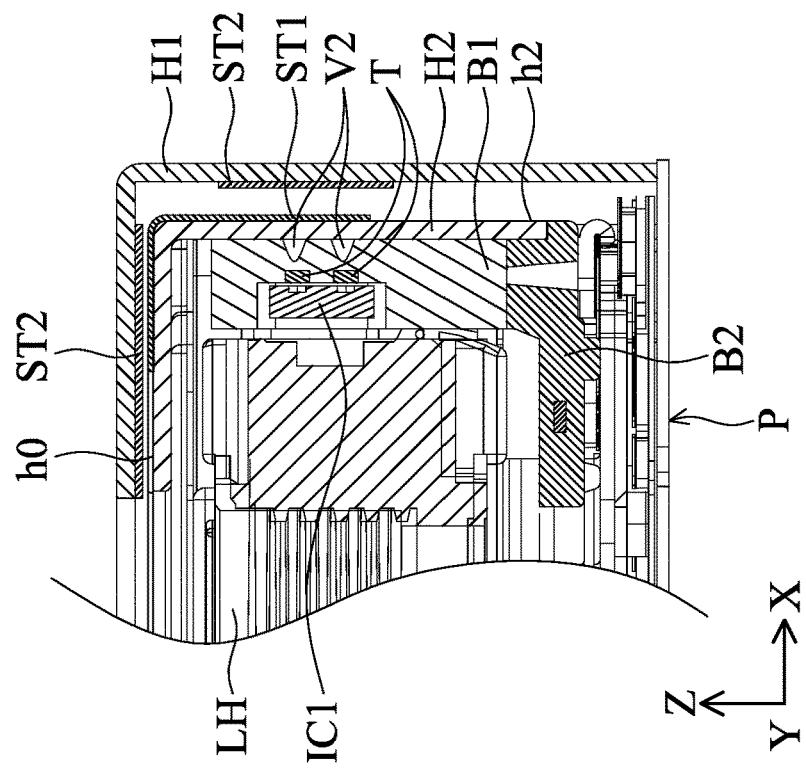
FIGS. 19 and 20 are exploded diagrams of a driving mechanism in accordance with another embodiment of the invention.
Figure 19:
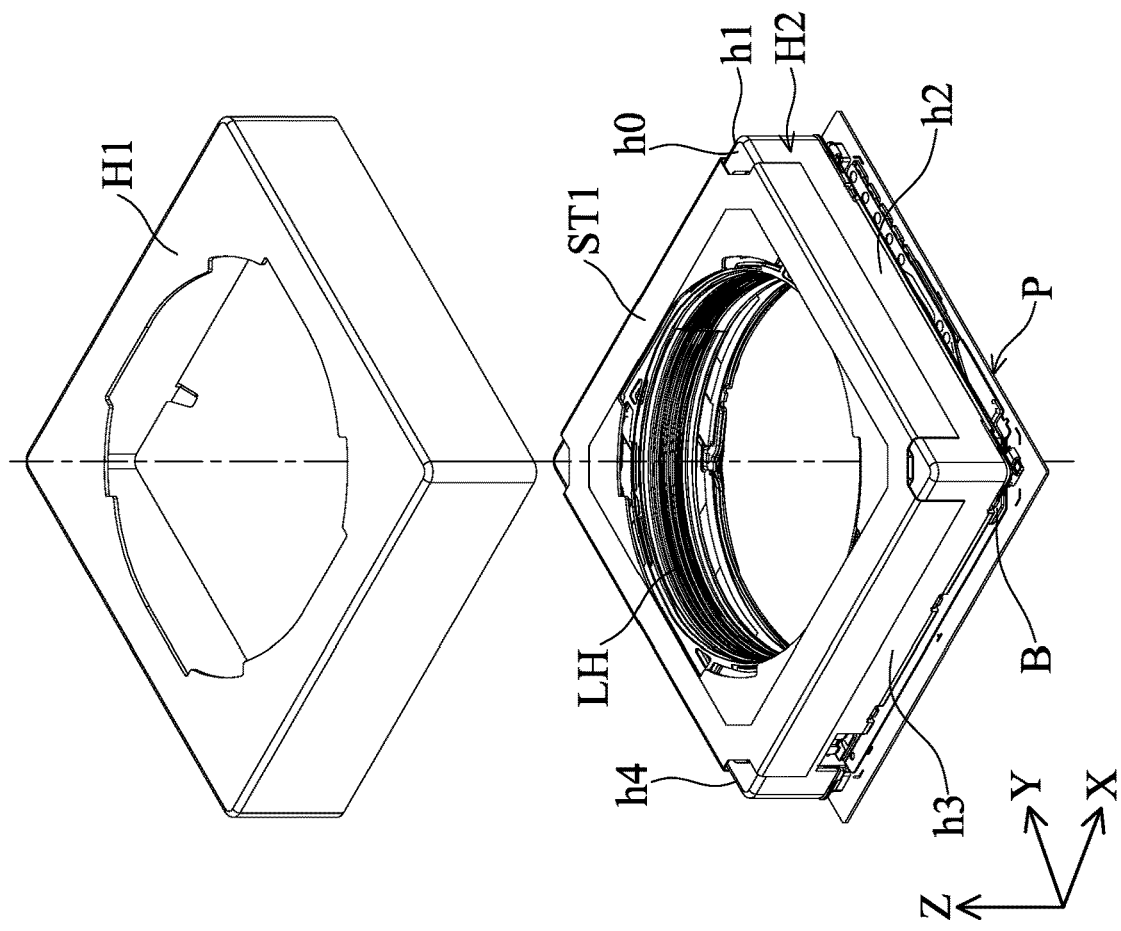

FIGS. 19 and 20 are exploded diagrams of a driving mechanism in accordance with another embodiment of the invention. Referring to FIGS. 19 and 20, the driving mechanism in this embodiment further comprises a thin buffer member ST1 (e.g. flexible sheet) extending from the top cover h0 to at least one of the four sidewalls h1, h2, h3, and h4.

Here, the outer case H1 and the fixed part B are affixed to a bottom unit P. Two flexible sheets ST2 are disposed on the inner surfaces of the outer case H1 and respectively facing the top cover h0 and the sidewall h2 (FIG. 20). When the driving mechanism is impacted by an external object, the buffer member ST1 and the flexible sheets ST2 can absorb collision energy between the outer case H1 and the housing H2, so as to prevent damages and functional failures of the driving mechanism.

In some embodiments, the buffer member ST1 can be connected to the housing H2 by adhesive or insert molding. Since the buffer member ST1 projects outward from the top cover and the sidewalls of the housing H2, collision energy between the outer case H1 and the housing H2 can be efficiently absorbed, thus enhancing the reliability and prolong the usage life of the driving mechanism.

Figure 22:
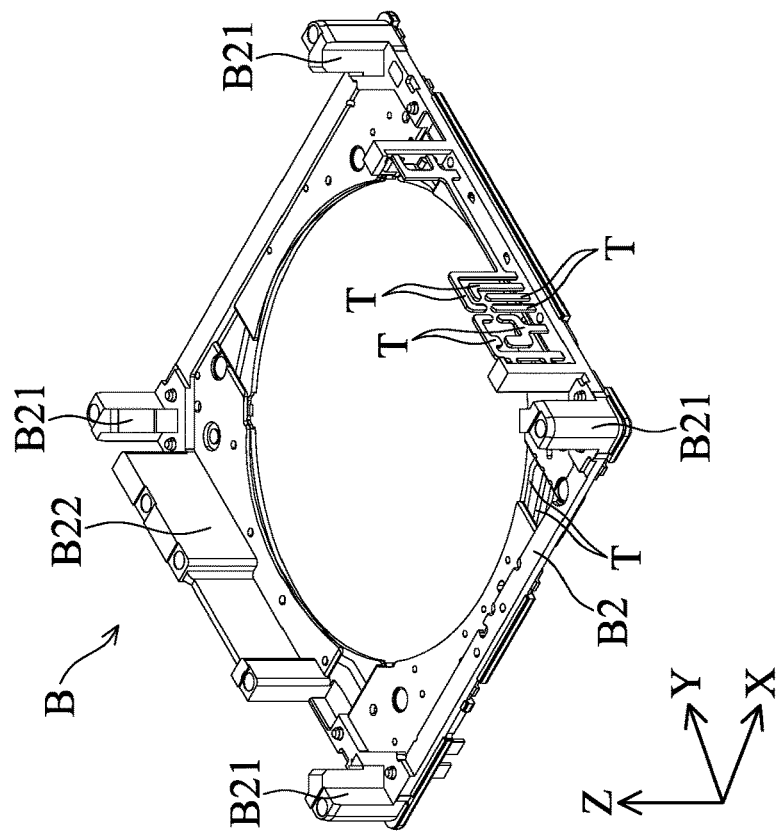
FIG. 22 is a perspective diagram of the fixed part B in FIG. 21 with the first plastic body B1 omitted therefrom.
Figure 21:
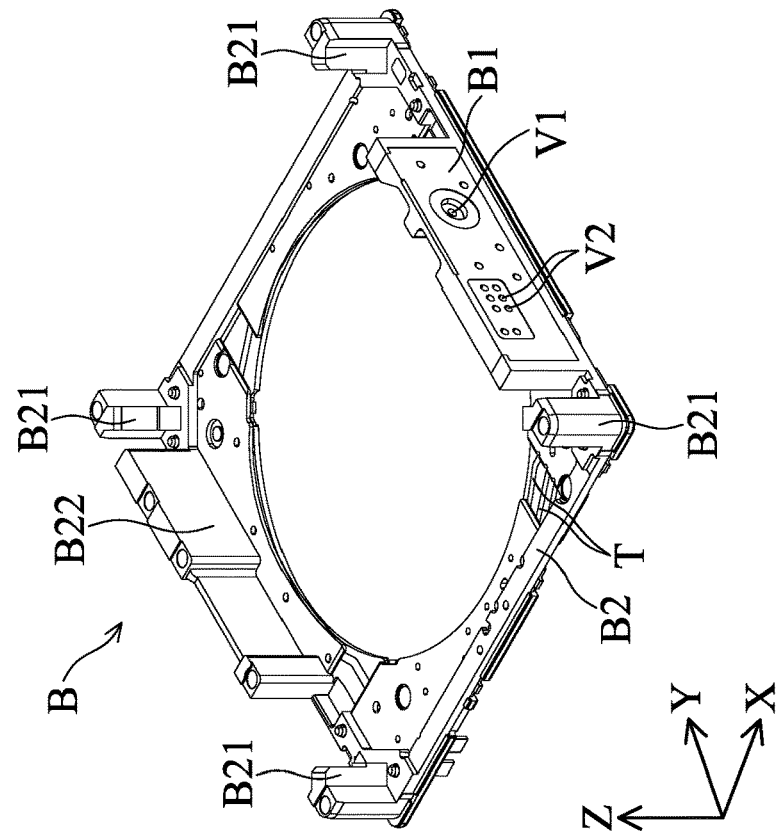
FIG. 21 is a perspective diagram of a fixed part B in accordance with another embodiment of the invention.
Figure 24:
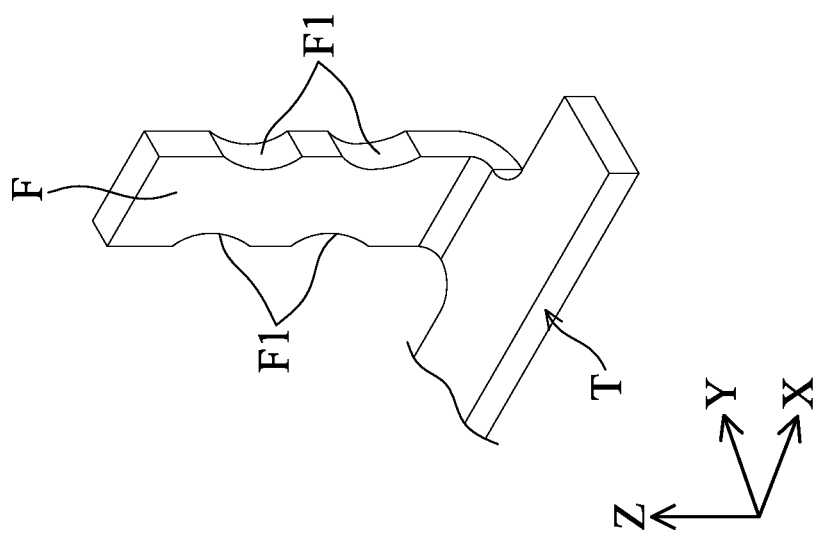
FIG. 24 is an enlarged view of an engaging portion F at an end of a conductive element T.
Figure 23:
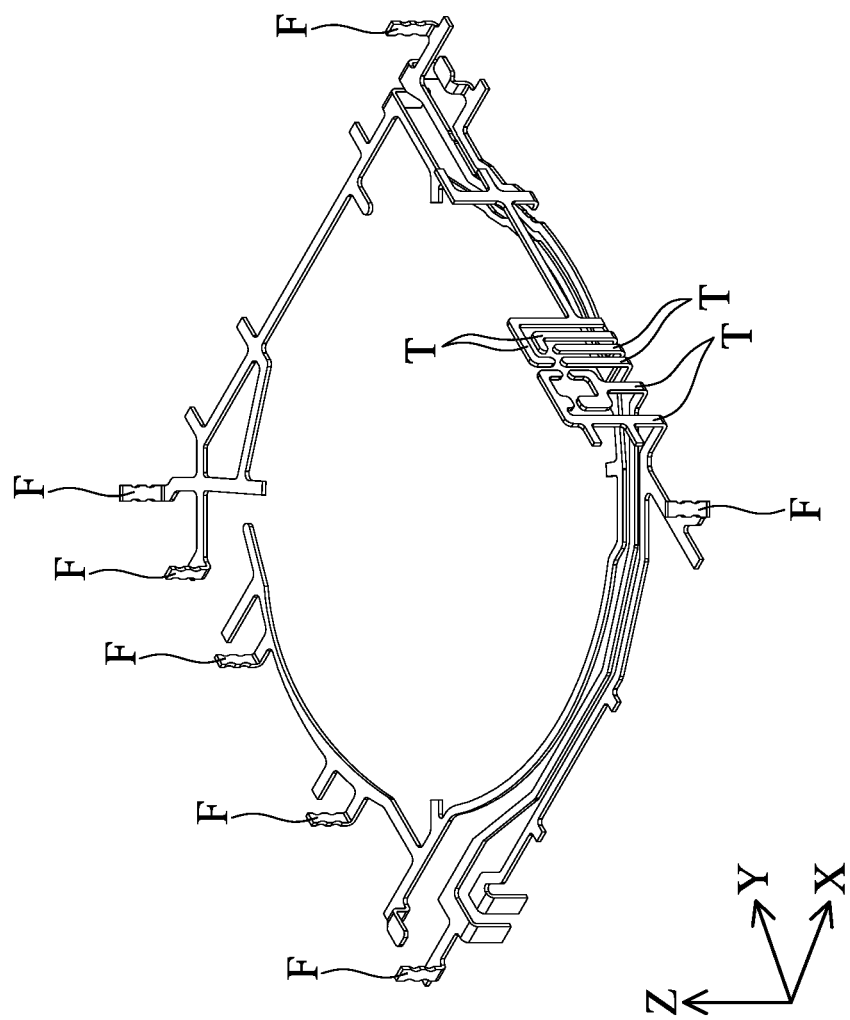
FIG. 23 is a perspective diagram showing several conductive elements T embedded in the fixed part B.

FIG. 21 is a perspective diagram of a fixed part B in accordance with another embodiment of the invention. FIG. 22 is a perspective diagram of the fixed part B in FIG. 21 with the first plastic body B1 omitted therefrom. FIG. 23 is a perspective diagram showing several conductive elements T embedded in the fixed part B. FIG. 24 is an enlarged view of an engaging portion F at an end of a conductive element T.

Referring to FIGS. 21 to 24, several metal conductive elements T are embedded in the fixed part B, wherein the terminals T' of the conductive elements T are exposed to the depressed structure B10 of the first plastic body B1, so as to connect to the IC elements IC1 and IC2 (FIGS. 7 and 8).

As shown in FIGS. 21 and 22, four protrusions B21 are formed on the four corners of the quadrilateral fixed part B, and they extend upward along the optical axis of the optical element (Z direction). Moreover, a wall B22 is formed on a side of the fixed part B and substantially parallel to the YZ plane. Referring to FIGS. 23 and 24, an engaging portion F is formed at an end of each conductive element T, and the engaging portion F extends upward along the optical axis of the optical element (Z direction). In this embodiment, the fixed part B can be formed by insert molding to partially cover the conductive elements T. Thus, the engaging portions F are embedded in the protrusions B21 and the walls B22 of the fixed part B, whereby mechanical strength of the fixed part B can be efficiently increased.

It should be noted that each of the engaging portions F has a flat structure as shown in FIG. 24, and at least a recess F1 is formed at an edge of each engaging portion F. Thus, the contact area between the engaging portions F and the protrusions B21 (or the walls B22) can be increased. Moreover, since the engaging portions F are not parallel to each other, the connection strength between the conductive elements T and the fixed part B can be enhanced, and the reliability of the driving mechanism can also be increased.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for driving an optical element to move, comprising:
    a movable part, configured to hold the optical element;
    a fixed part, connected to the movable part, wherein the movable part is movable relative to the fixed part; and
    a housing connected to the fixed part, having a top cover and at least a sidewall connected to the top cover; and
    a buffer member, disposed on the housing and extending from the top cover to the sidewall, wherein the buffer member covers a part of the housing by insert molding.

2. The driving mechanism as claimed in claim 1, wherein the housing has two sidewalls connected to the top cover, and the buffer member extends into a gap between the two sidewalls.

3. The driving mechanism as claimed in claim 2, wherein the sidewalls respectively form a slope surface adjacent to the gap.

4. The driving mechanism as claimed in claim 1, wherein the buffer member covers a corner of the housing and protrudes outward from the top cover and the sidewall.

5. The driving mechanism as claimed in claim 1, wherein the buffer member comprises plastic material, and a recess and a nub are formed on the buffer member, wherein the nub is located in the recess.

6. The driving mechanism as claimed in claim 1, wherein the top cover is quadrilateral in shape, and the housing has four sidewalls connected to the top cover, wherein the buffer member extends from the top cover to the four sidewalls.

7. The driving mechanism as claimed in claim 1, further comprising an outer case and a flexible sheet disposed on an inner surface of the outer case, wherein the flexible sheet faces the top cover of the housing.

8. The driving mechanism as claimed in claim 1, further comprising an outer case and a flexible sheet disposed on an inner surface of the outer case, wherein the flexible sheet faces the sidewall of the housing.

9. The driving mechanism as claimed in claim 1, wherein the fixed part forms a recess, and the movable part forms a protrusion received in the recess, wherein the protrusion has two chamfered surfaces arranged along an optical axis of the optical element, and the two chamfered surfaces constitute a step structure that is tapered along the optical axis.

10. A driving mechanism for driving an optical element to move, comprising:
    a movable part, configured to hold the optical element;
    a fixed part, connected to the movable part, wherein the movable part is movable relative to the fixed part; and
    a housing connected to the fixed part, having a top cover and at least a sidewall connected to the top cover;
    a buffer member, disposed on the housing and extending from the top cover to the sidewall; and
    a first adhesive and a second adhesive, wherein the fixed part forms a cavity, and the housing forms a through hole corresponding to the cavity, wherein the first adhesive is disposed between the housing and the fixed part, and the second adhesive is disposed in the cavity and the through hole.

11. The driving mechanism as claimed in claim 10, wherein the cavity is formed and shaped corresponding to an injection nozzle of a mold during a molding process of the fixed part.

12. The driving mechanism as claimed in claim 10, further comprising a conductive element embedded in the fixed part, and the second adhesive is disposed in the cavity and contacts the conductive element.

13. The driving mechanism as claimed in claim 10, wherein the viscosity of the second adhesive is higher than the viscosity of the first adhesive.

14. A driving mechanism for driving an optical element to move, comprising:
    a movable part, configured to hold the optical element;
    a fixed part, connected to the movable part, wherein the movable part is movable relative to the fixed part; and
    a housing connected to the fixed part, having a top cover and at least a sidewall connected to the top cover;
    a buffer member, disposed on the housing and extending from the top cover to the sidewall; and
    a conductive element, wherein the fixed part forms a protrusion extending along an optical axis of the optical element, and the conductive element has an engaging portion extending along the optical axis and embedded in the protrusion.

15. The driving mechanism as claimed in claim 14, wherein a plurality of recesses are formed at an edge of the engaging portion.

16. The driving mechanism as claimed in claim 14, further comprising a plurality of conductive elements, wherein the fixed part forms a plurality of protrusions extending along the optical axis of the optical element, and the conductive elements respectively have an engaging portion extending along the optical axis and embedded in the protrusions.

17. The driving mechanism as claimed in claim 16, wherein a plurality of recesses are formed at an edge of the engaging portion.

18. The driving mechanism as claimed in claim 16, wherein each of the engaging portions has a flat structure, and the engaging portions are not parallel to each other.

19. The driving mechanism as claimed in claim 16, wherein the fixed part is quadrilateral in shape, and the protrusions are located at four corners of the fixed part.

* * * * *